March 11, 1924.
J. G. CAPSTAFF ET AL
1,486,226
MOTION PICTURE APPARATUS
Filed July 17, 1922   3 Sheets-Sheet 1
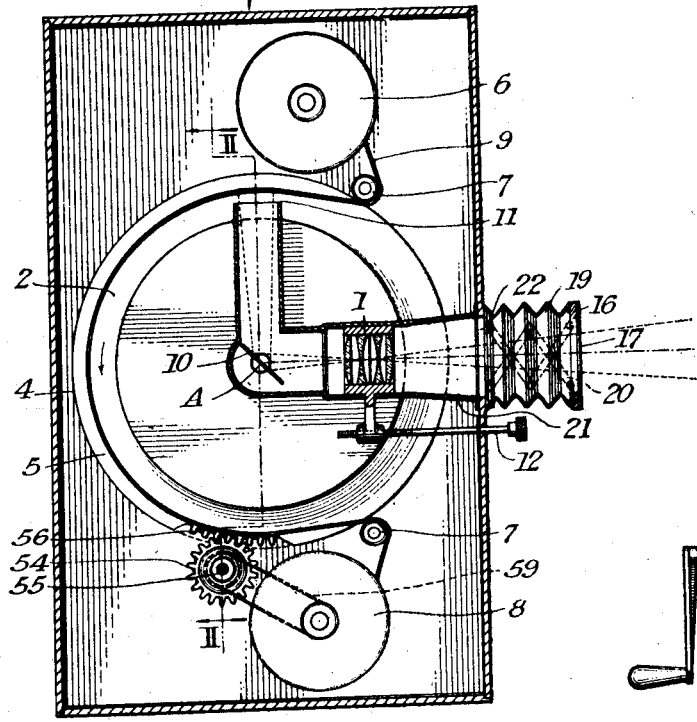
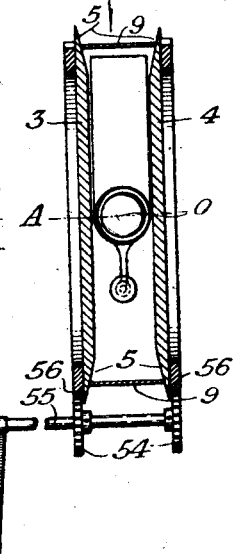
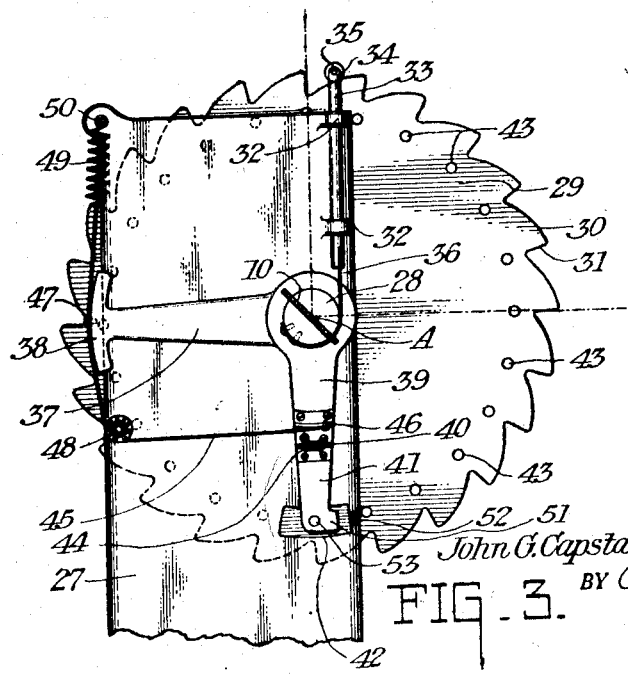
INVENTORS,
John G. Capstaff & Newton B. Green,
BY R. L. Stinchfield
ATTORNEYS.

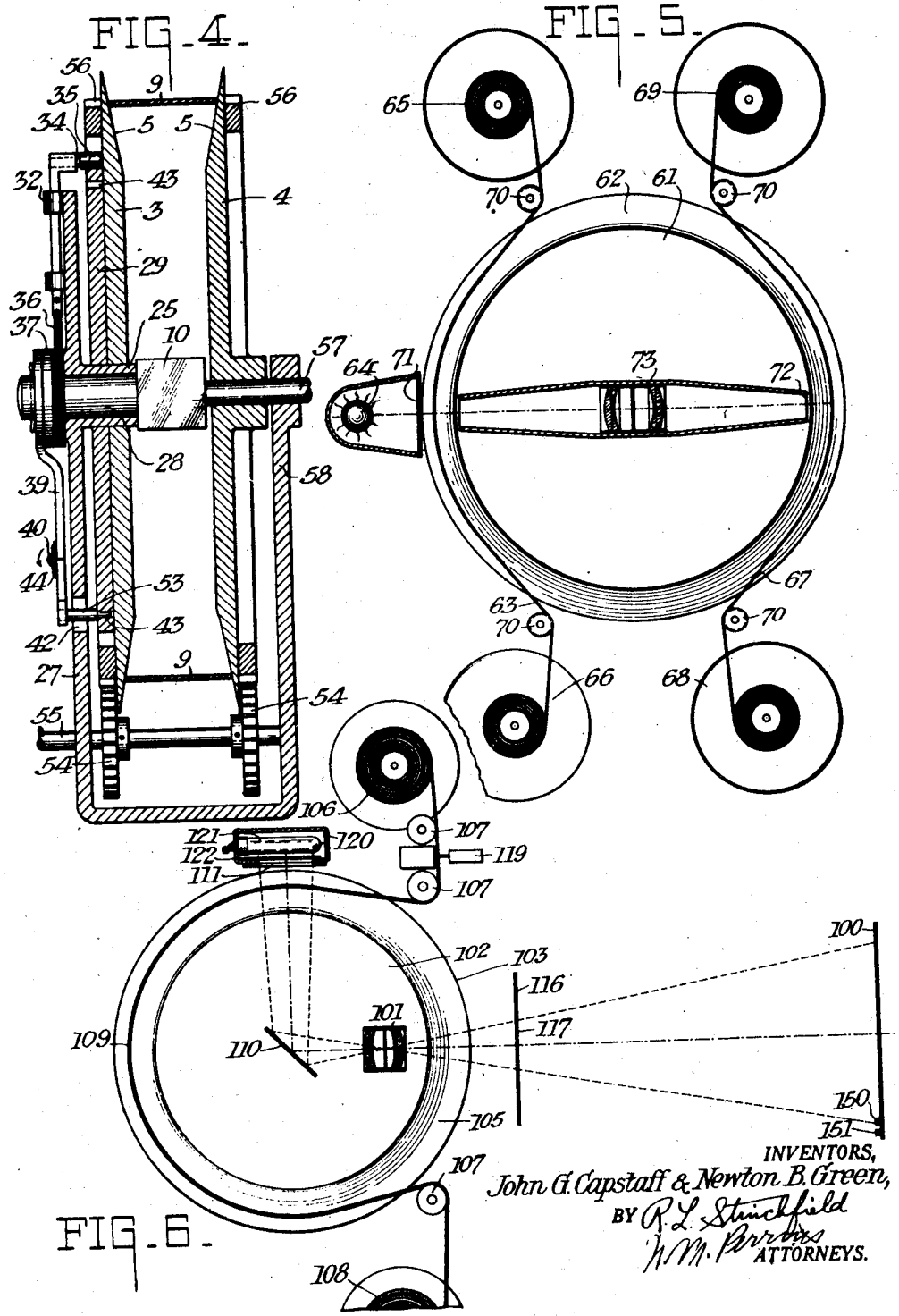

March 11, 1924.
J. G. CAPSTAFF ET AL
MOTION PICTURE APPARATUS
Filed July 17, 1922
1,486,226
3 Sheets-Sheet 3
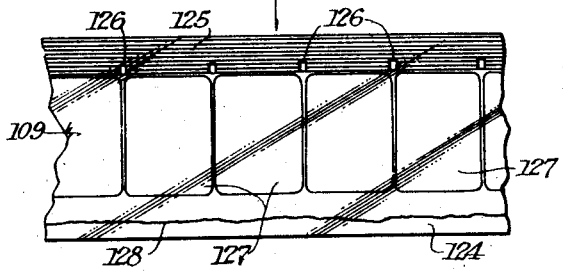
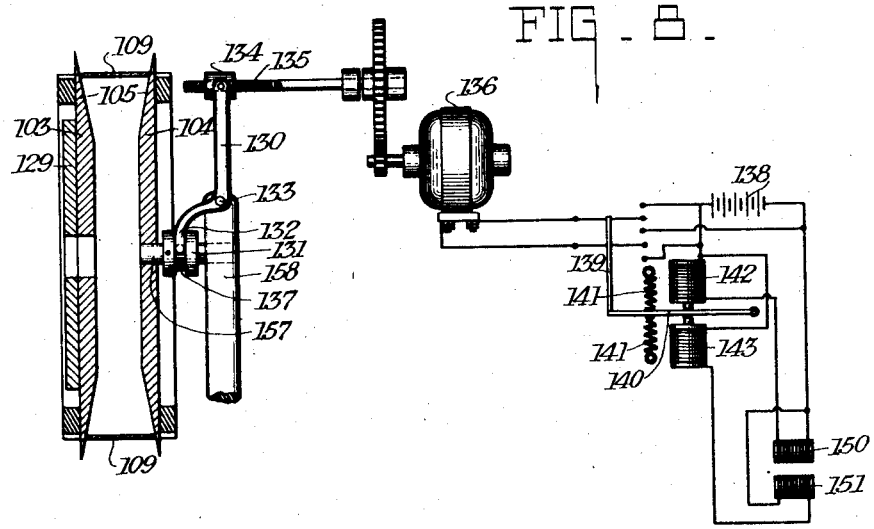
INVENTORS,
John G. Capstaff & Newton B. Green,
BY
ATTORNEYS.

Patented Mar. 11, 1924.

1,486,226

UNITED STATES PATENT OFFICE.

JOHN G. CAPSTAFF AND NEWTON B. GREEN, OF ROCHESTER, NEW YORK, ASSIGNORS TO EASTMAN KODAK COMPANY, OF ROCHESTER, NEW YORK, A CORPORATION OF NEW YORK.

MOTION-PICTURE APPARATUS.

Application filed July 17, 1922. Serial No. 575,596.

*To all whom it may concern:*

Be it known that we, JOHN G. CAPSTAFF and NEWTON B. GREEN, a subject of the King of Great Britain and a citizen of the United States of America, respectively, residing at Rochester, in the county of Monroe and State of New York, have invented certain new and useful Improvements in Motion-Picture Apparatus, of which the following is a full, clear, and exact specification.

This invention relates to motion picture apparatus and particularly to apparatus capable of advancing film, which may be unperforated, at a constant angular speed. If an acoustic record is placed upon the film, and this seems to be the most practical way of assuring synchronism between sound and light records, it is absolutely essential that the movement of the film shall be uniform; and while we do not show herein details of an acoustic recording or reproducing system and do not herein claim such a system, we consider the mechanisms herein shown and claimed as of particular use in such a combination.

It is well known that the materials of which photographic films are made shrink with time and particularly under the effects of the photographic baths which they must undergo. The extent of this shrinkage is not uniform. One of the objects of our invention is to devise a mechanism that will automatically compensate for the alterations in size due to shrinkage of the film. A principal mechanical feature of the invention is the use of a pulley comprising spaced discs with beveled faced margins. As the film edges engage these bevels, they will tend to rise and fall therein with variations in size of the film but the angular velocity of the film will be constant. The application of this feature to various types of mechanism is fully described hereinafter, and other objects and details of our invention will appear upon an examination of the following description, reference being made to the appended drawings, in which the same reference characters refer to the same parts throughout, and in which—

Fig. 1 is a view, largely diagrammatic, of a camera embodying our invention;

Fig. 2 is a fragmentary view of the discs and their driving means;

Fig. 3 is a side detail view of the mechanism providing for the optical rectification of the image.

Fig. 4 is a sectional detail view of the same mechanism;

Fig. 5 is a diagrammatic view of a projection printer embodying our invention;

Fig. 6 is a diagrammatic view of a projector embodying our invention;

Fig. 7 shows a section of film such as is used in our improved projector; and

Fig. 8 is a diagram illustrating mechanism for automatically controlling the framing of the projected picture.

In Fig. 1, which indicates, largely diagrammatically, the camera, 1 is a lens with a focusing adjustment 12 with respect to the axis A of a rotating pulley 2. This pulley comprises two separated discs 3 and 4 shown in Fig. 2, the inner surfaces of which are uniformly beveled entirely around their circumference, as indicated at 5. The inclination of this bevel is preferably such that radial lines extended therefrom would pass through the point O on the axis A midway between the discs. The unperforated film 9 is drawn by the pulley 2 from a supply reel 6 over a guide pulley 7, to a take-up reel 8. In passing around the pulley 2 the edges of the film 9 rest on the inclined beveled portions 4, as indicated in Fig. 2, the exact position being determined by the width of the film 9, the separation of the discs 2 and the inclination of the bevels 5. There is a standard width of film and in practice the parts will be so designed that this will ride at a particular preferred position on the bevels. The pulley 2 turns in the direction indicated by the arrow. A mirror 10 is mounted to oscillate about the axis A of the pulley. The oscillation in the direction of movement of the pulley is at half the angular speed of the pulley but the return oscillation is as rapid as the mechanical structure will permit.

There is, between the discs, a fixed exposure gate 11, subtending an angle of 15° at the axis A of the pulley. A frame 16 with an aperture 17 is mounted in front of the lens 1 and defines the subject field of which pictures are to be taken. The relative sizes of these are such that the gate 11 is of the same width as the field defined by window 17 and projected through the lens, but twice as long. The mirror is mounted to oscillate through an angle of substantially 7½ degrees, so that the projected image of aperture 17 is oscillated back and forth at gate 11, moving in one direction at the same speed as the film. The lens 1 is, of course, adjustable for focusing and the frame 16 for that reason movable to and from the front of the camera box 18, so that the size of the area projected at 11 will be constant. A bellows 19 and suitable side braces 20 connect the box and frame. The lens 1 is carried by a light-tight tube 21, extending between the discs and surrounding an opening 22 in the front of the camera box.

The disc 3 is mounted to rotate on a fixed hollow trunnion 25, carried by fixed frame 27. Through this trunnion extends the oscillating shaft 28 carrying the mirror 10. Carried by disc 3 is cam 29 having on its periphery a series of surfaces 30 with shoulders 31. There are twenty-four of these cam surfaces. The frame 27 carries guides 32 in which slides the rod 33 carrying a rigid crosspin 34 at its upper end which supports the roller 35 engaging the cam surfaces 30. To the lower end of this rod 33 is attached a flexible metal band 36 which is attached to the oscillating shaft 28. The cam surfaces 30 are spiral relative to the axis A and are so designed as to give uniform angular motion to the mirror. The shoulders 32 are in the shape of a "gravity curve," that is, of a parabola, the exact shape of the curve being dependent on the constant acceleration due to the spring and the angular velocity of the pulley.

Rigidly carried by the shaft 28 is an arm 37 with a head 38 having an arcuate surface 47 concentric with axis A. Loosely mounted on shaft 28 beyond said arm is a second arm 39, to which is pivoted at 40 an extension 41 carrying a pin 53. This pin passes through a suitable aperture 42 in frame 27 and engages one of a series of twenty-four equally spaced apertures 43 in the surface of cam 29 and equidistant from the axis A. A spring 44 presses extension 41 toward the cam surface. A metal tape 45 is attached to arm 39 at the arcuate surface 46 the distance of which from axis A is half the distance therefrom of the arcuate surface 47. This tape passes over a guide roller 48 and then over the arcuate surface 47 and then extends tangentially and is connected to a spring 49 attached to frame 27 at 50.

The pulley 48 is so placed that the tape 45 is tangential to the arcuate surfaces 46 and 47, both of which have their center of curvature at the axis A. As the central positions of the arms 37 and 39 are approximately at a right angle to each other and as their angular movement is not great, the arcuate surfaces are so designed that for all operative positions of the arms the tape will be tangential to them.

The extension 41 has a projection 51 adapted at one end of its stroke to engage wedge 52 on frame 27 and be lifted thereby, thus disengaging pin 53 from the aperture 43. Disc 4 is carried on shaft 57 journaled in the fixed frame member 58. Both discs have annular racks 56 engaged by pinions 54 on the driving shaft 55, which also has a frictional belt drive connection 59 with take-up reel 8.

The operation is as follows:

The disc 3 and cam 29 rotate uniformly. The roller 35 rolls up on a cam surface 30 and, through rod 33 and band 36, turns the shaft 28 until the roller reaches the abrupt shoulder 31. At the same time, through the engagement of pin 53 with an aperture 43, the cam is turning the arm 39, until the wedge 52 engages projection 51 to lift the pin 53 out of the aperture. During this movement arm 39 draws band 45 which, by frictional engagement with the surface 38, turns arm 37 and shaft 28, the angular speed of which is half that of arm 39. Thus both the roller 35 and arm 39 operate simultaneously to turn shaft 28, and the pin 53 is disengaged from 43 as roller 35 reaches shoulder 31. The spring 49 then draws band 45 and arm 39 rapidly back, and band 45 moves head 39, arm 37, shaft 28, band 36, and roller 35 to their original position. Pin 53 snaps into engagement with the next aperture 43 and the cycle is repeated.

Both the cam and roller connection and the pin and aperture connection are so designed as to give the mirror a uniform forward velocity at half the speed of the disc 3 and a quick return. Either motion is sufficient in itself but the two together cooperate to give a mechanically steadier and more reliable movement and return.

It is obvious that if the film is somewhat narrower or wider than standard, it will ride further down or up on the bevels, but its angular velocity will be constant as it passes the exposure gate.

A printing machine involving our invention is shown in Fig. 5. In this a pulley 61 consisting of separated discs with inwardly beveled edges 62, as described in connection with the camera, is used. This pulley rotates at a uniform speed and draws negative film 63 downwardly past a lamphouse 64 from a supply reel 65 to a take-up reel 66; and simultaneously draws the sensitive positive film 67 from a supply reel 68 to a take-up reel 69. Suitable guide pulleys 70 hold the films in contact with the pulley. In the front of the lamphouse is a slit 71, light from which falls on the moving negative film 63 and the lens 73 which is at the axis of the pulley projects the image on the positive film at 72. As both films have the same uniform angular velocity, a sharp image is projected. The exposure areas 71 and 72 constitute gates for the films.

As the negative film will have shrunk from the photographic baths, it will as a rule ride further down the pulleys than the sensitive positive film. Moreover the widths of the films, particularly the negative film, may vary slightly. In such case the film will ride up and down the bevels. In any event the two films will pass the projection lens at the same angular velocity and sharp images will be impressed on the positive film. All of these elements are supported and driven in an obvious manner and the diagrammatic showing of Fig. 5 sufficiently illustrates the subject.

The projector is similar to the camera except for the details which will be pointed out. The optical rectifying system and mechanism is the same. Instead of an exposure gate, however, there is a projecting gate 111 past which the film 109 is drawn by the pulley 102 comprising discs 103 and 104 with beveled margins 105, one disc carrying a cam 129 corresponding to cam 29. The film is drawn from a supply reel 106 by the pulley 102 past sound reproducer 119, over guide pulleys 107, to take-up reel 108. Behind gate 111 is a lamphouse 120 with an elongated lamp 121 and a diffusing glass sheet 122, designed to illuminate the gate 11 uniformly. The image of the film at the gate is reflected by oscillating mirror 110 and projected by lens 101 through a window 117 in an adjustable panel 116 upon a suitable projecting screen 100. The window 117 determines the projected picture area and is adjustable in all directions. The gate 111 is of such size as to illuminate two picture areas.

The positive film 109 used is shown in Fig. 7. It is unperforated and has along one edge a margin 124 which may carry an acoustic record 128 and along the other edge a margin 125, the latter being opaque except for small transparent areas 126 in registered position opposite each picture area 127. At the screen there are two separated photo-responsive resistance cells 150 and 151, between which the image of areas 126 is projected.

Disc 104 is slidable on shaft 157 which is journaled in frame 158. The collar 131 carried by the disc and surrounding the shaft 157 has a deep groove 137 engaged by a yoke 132 carried by an arm 130 pivoted to the fixed frame 158 at 133 and at its other end pivoted to a nut 134, the internal thread of which is engaged by a screw 135 turned by the D. C. motor 136. In circuit with the motor 136 and the battery 138 is a pole changing switch 139. This is controlled by the pivoted armature 140 which is normally held by springs 141 in such position as to hold the switch in intermediate or open position. The electro-magnets 142 and 143 are placed on opposite sides of this armature and tend to attract it in one direction or the other. One of these magnets 142 is in the circuit with one photo sensitive cell 150, and the other with the other cell 151. If the projected beam of light through areas 126 falls, as it should, between the cells, the armature will remain in intermediate position. If the beam wanders in one direction, it will fall on one cell, energizing one magnet, which will close the circuit in one direction through the motor and turn it in one direction, while if the beam wanders in the other direction, it will result in the motor turning in the opposite direction. This action results in movement of disc 104 toward or from the other disc 103 and this causes the film to ride up or down on the bevels, thus correcting the framing. As soon as the beam is again properly positioned, the switch is restored to normal position.

Thus any variations in width of film in any of the apparatus will not affect its angular velocity through the apparatus; and variations of any kind during projection are at once corrected. Of course, the automatic control can be disconnected and the operator can control framing manually by operating the arm 138, moving it in one direction or the other as he observes a drift in the projected picture.

A sound record 128 may be made in any manner on the border 124 of the positive film 129, and suitable sound reproducing mechanism 119 is located at the projector. As these are not claimed herein, no further description of them need be given. The apparatus which is herein claimed is, however, particularly useful in this conbination since it draws the film in a particularly smooth and uniform manner past the acoustic device, and this is an essential requirement for sound recording and reproduction.

Having thus described our invention, what we claim as new and desire to secure by Letters Patent is:

1. Means for advancing motion picture film comprising two, spaced, co-axial discs, having the margins of their facing surfaces beveled so that the edges of a long strip of film may ride thereon, separate means on each disc whereby it may be turned, and driving means operating on said means to rotate said discs at the same speed, said common driving means being the only operative connection between the discs.

2. Means for advancing motion picture film comprising two, spaced, co-axial discs, having the margins of their facing surfaces beveled so that the edges of a long strip of film may ride thereon, separate means on each disc whereby it may be turned, and driving means operating on said means to rotate said discs at the same speed, said common driving means being the only operative connection between the discs, one of said discs being adjustable toward and from the other, whereby the distance from the axis of film riding on the bevels may be varied.

3. Motion picture apparatus comprising a pulley, means for rotating said pulley, said pulley comprising separated discs having bevels on the margins of their facing surfaces, means for supplying a long band of film so that the edges thereof will lie upon said bevels and be advanced thereby, a gate positioned in the path of such film around said pulley and an optical system comprising a lens focused on said gate.

4. Motion picture apparatus comprising a pulley, means for rotating said pulley, said pulley comprising separated discs having bevels on the margins of their facing surfaces, means for supplying a long band of film so that the edges thereof will lie upon said bevels and be advanced thereby, a gate positioned in the path of such film around said pulley and an optical system comprising a lens focused on said gate, the light projected through the optical system crossing the axis of the pulley.

5. Motion picture apparatus comprising a pulley, means for rotating said pulley, said pulley comprising separated discs having bevels on the margins of their facing surfaces, means for supplying a long band of film so that the edges thereof will lie upon said bevels and be advanced thereby, a gate positioned in the path of such film around said pulley and an optical system comprising a lens focused on said gate, one of said discs being axially adjustable.

6. Motion picture apparatus comprising a pulley, means for rotating said pulley at a uniform rate, said pulley comprising separated discs having bevels on the margins of their facing surfaces, means for supplying a long band of film so that the edges thereof will ride upon said bevels and be advanced continuously thereby, a gate positioned in the path of such film around said pulley and an optical system comprising a lens focused on said gate.

7. Motion picture apparatus comprising a pulley, means for rotating said pulley at a uniform rate, said pulley comprising separated discs having bevels on the margins of their facing surfaces, means for supplying a long band of film so that the edges thereof will ride upon said bevels and be advanced continuously thereby, a gate positioned in the path of such film around said pulley and an optical system comprising a lens focused on said gate and a mirror at said axis adapted to oscillate in timed relation with the rotation of said pulley.

8. Motion picture apparatus comprising a pulley, means for rotating said pulley at a uniform rate, said pulley comprising separated discs having bevels on the margins of their facing surfaces, means for supplying a long band of film so that the edges thereof will ride upon said bevels and be advanced continuously thereby, a gate positioned in the path of such film around said pulley and an optical system comprising a lens focused on said gate and a mirror at said axis adapted to oscillate in timed relation with the rotation of said pulley, the angle of oscillation being substantially half of the angle subtended by the gate.

9. Motion picture apparatus comprising a pulley, means for rotating said pulley at a uniform rate, said pulley comprising separated discs having bevels on the margins of their facing surfaces, means for supplying a long band of film so that the edges thereof will ride upon said bevels and be advanced continuously thereby, a gate positioned in the path of such film around said pulley and an optical system comprising a lens focused on said gate and a mirror at said axis adapted to oscillate in timed relation with the rotation of said pulley, the rate of oscillation in the direction of rotation of the pulley being such as to move the projected light beam at the gate at the same rate as the film, and the rate of oscillation in the reverse direction being very rapid.

10. Motion picture apparatus comprising a pulley, means for rotating said pulley, said pulley comprising separated discs having bevels on the margins of their facing surfaces, means for supplying a long band of film so that the edges thereof will lie upon said bevels and be advanced thereby, a gate positioned in the path of such film around said pulley and an optical system comprising a lens focused on said gate, and a lamphouse outside of said pulley and gate, and adapted to illuminate the gate.

11. Motion picture apparatus comprising a pulley, means for rotating said pulley, said pulley comprising separated discs having bevels on the margins of their facing surfaces, means for supplying a long band of film so that the edges thereof will lie upon said bevels and be advanced thereby, a gate positioned in the path of such film around said pulley and an optical system comprising a lens focused on said gate, the light projected through the optical system crossing the axis of the pulley and a lamphouse outside of said pulley and gate, and adapted to illuminate the gate.

12. Motion picture apparatus comprising a pulley, means for rotating said pulley, said pulley comprising separated discs having bevels on the margins of their facing surfaces, means for supplying a long band of film so that the edges thereof will lie upon said bevels and be advanced thereby, a gate positioned in the path of such film around said pulley and an optical system comprising a lens focused on said gate, and a lamphouse outside of said pulley and gate, and adapted to illuminate the gate, means for adjusting one of said discs axially, whereby the distance from the axis of a film riding on said bevels may be varied.

13. Motion picture apparatus comprising a pulley, means for rotating said pulley, said pulley comprising separated discs having bevels on the margins of their facing surfaces, means for supplying a long band of film so that the edges thereof will lie upon said bevels and be advanced thereby, a gate positioned in the path of such film around said pulley and an optical system comprising a lens focused on said gate, and a lamphouse outside of said pulley and gate, and adapted to illuminate the gate, means for adjusting one of said discs axially, whereby the distance from the axis of a film riding on said bevels may be varied and means controlled by the image projected through said optical system from said illuminated gate for controlling said adjusting means.

14. In combination, a motion picture film comprising a long band with a series of picture areas, there being a light transmitting spot associated with each area, means for advancing said film at a uniform rate comprising two-spaced discs with bevels at the margins of the facing surfaces, the film riding on said bevels, means for adjusting one disc axially whereby to vary the distance from the axis of the film, a gate in the path of travel of said film around said discs and a lamphouse for illuminating said gate, a projection screen, and an optical system for projecting on said screen a fixed area and a fixed illuminated spot corresponding to the moving picture areas and moving spots on said film, and light responsive means at said screen and controlled by movement of the projected spot and adapted to control the axial adjustment of the said disc.

15. In combination, a motion picture film comprising a long band with a series of picture areas, there being a light transmitting spot associated with each area, means for advancing said film at a uniform rate comprising two-spaced discs with bevels at the margins of the facing surfaces, the film riding on said bevels, means for adjusting one disc axially whereby to vary the distance from the axis of the film, a gate in the path of travel of said film around said discs and a lamphouse for illuminating said gate, a projection screen, and an optical system for projecting on said screen a fixed area and a fixed illuminated spot corresponding to the moving picture areas and moving spots on said film, and two light responsive elements at the screen between which the projected spot should fall, the elements being severally responsive to stimulus from such spot in case of its movement in one direction or the other to control the adjustment of said axially adjustable disc toward or from the other disc.

Signed at Rochester, New York, this 13th day of July, 1922.

JOHN G. CAPSTAFF.
NEWTON B. GREEN.